(No Model.)

T. A. LANSCHA.
CHECK ROWER.

No. 273,370. Patented Mar. 6, 1883.

Witnesses;

H. W. Well.

Rich⁴ A. Goldsbrough.

Inventor,

Theodore A. Lanscha, per A. B. Upham,
Attorney in fact.

N. PETERS, Photo-Lithographer, Washington, D. C.

UNITED STATES PATENT OFFICE.

THEODORE A. LANSCHA, OF FLANNIGAN, ILLINOIS.

CHECK-ROWER.

SPECIFICATION forming part of Letters Patent No. 273,370, dated March 6, 1883.

Application filed November 13, 1882. (No model.)

*To all whom it may concern:*

Be it known that I, THEODORE A. LANSCHA, of Flannigan, in the county of Livingston, in the State of Illinois, have invented an Improved Check-Rower; and I do hereby declare that the following is a full, clear, and exact description thereof, reference being had to the annexed drawings, making a part of this specification, in which like letters of reference refer to like parts, and in which—

Figure 1:
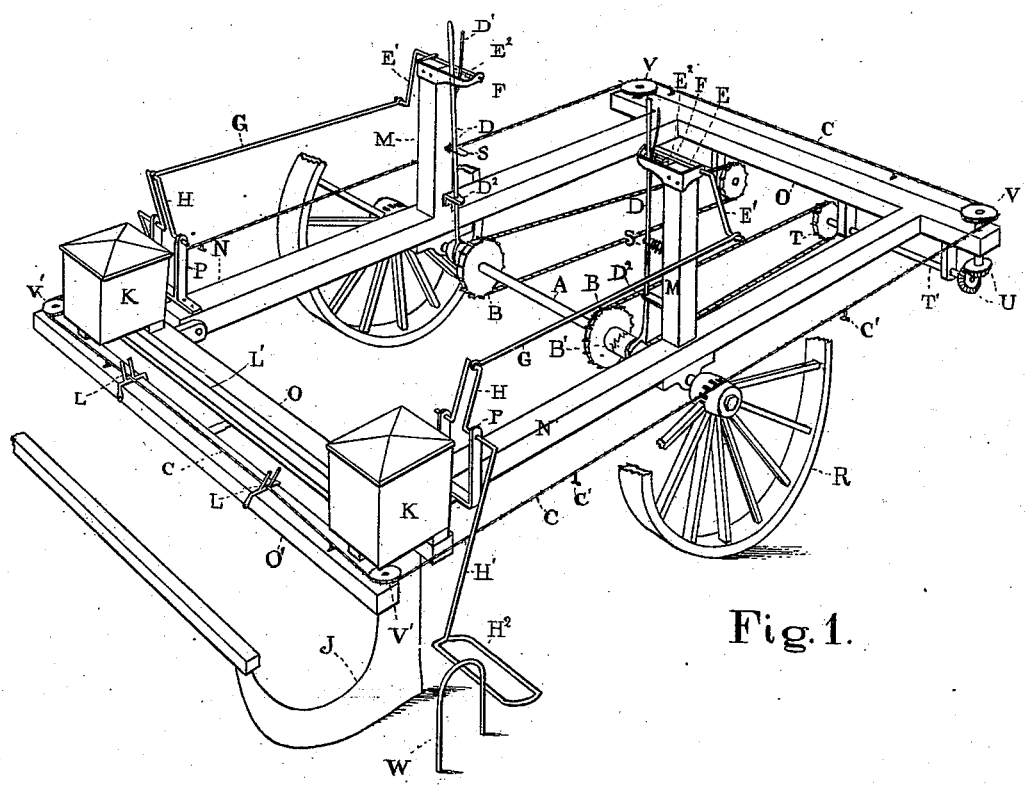
Figure 2:
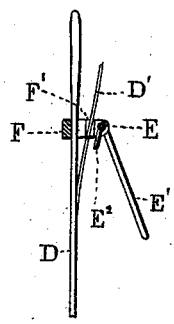

Figure 1 represents a perspective view of the machine; Fig. 2, detail.

My invention is in that line of check-rowers in which an endless chain or cord having catches or knots thereon is made to traverse about the seed-boxes impelled by mechanism connected with the drive-wheels to operate the feed-slide through forked levers rocked by said knots on said chain or cord.

In the drawings, N N O O O' represent the frame-work of my machine; R R, the drive-wheels; J, one of the shoes; K K, the seed-boxes; L', the feed-slide.

The shaft or axle A is rigidly fixed in one or both of the drive-wheels R R. The sprocket-wheels B B are loosely mounted upon said axle A, while the clutches B' B' are keyed to it, and are made to engage with or released from said wheels B B by the levers D D, pivoted at $D^2$ $D^2$ to the upright posts M M. The said sprocket-wheels B B communicate by means of chains to the sprocket-wheels T T, and from thence through shafts and gears to the horizontal sprocket-wheels V V. About said wheels V V and the horizontal sprocket-wheels V' V', at opposite corners of the check-rower, extends an endless chain, C C C, upon which, at suitable uniform distances apart, are links carrying depending inverted-T-shaped attachments C', fitted to engage with the forked levers L L. Said levers L L are arranged, as in other check-rowers of the kind, so that when one of them is tilted by the catch C' of the chain C the feed-slide is moved, causing one hill of corn to be dropped, and the other lever, L, tilted in the opposite direction to be ready in its turn to receive the catch-bar C'.

The levers D D, which operate the clutches B' B', have their upper ends pressed away from the posts M M by springs S S, and are movable in horizontal slots F F. In said slots F F are notches F' F', by means of which the levers D D can be retained with their upper ends near the posts M M and their lower ends holding the clutches B' B' in mesh with the wheels B B. A spring-rod, D', fastened at its lower end to the lever D, and pressed by its elasticity into said notch F', is the device I use to retain said lever D, as just described. Alongside of the slots F' F runs a short shaft, E E, having bearings thereat, and having affixed to it a leaf, $E^2$. The outer end of said shaft E terminates in a crank-arm, E', from which a rod, G, runs to the crank H, being pivoted thereto and to said crank-arm E'. The crank H, having elevated bearings P, has a long crank-arm, H' $H^2$, depending nearly to the ground.

In using this check-rower only one of the wheels B B is in clutch at the same time, since the sprocket-wheels V V are rotated thereby in opposite directions. One of the wheels B being in clutch, a wicket, W, is pushed into the ground near the head of the to-be-planted row of corn in line with the said wheel B in clutch. The machine is now driven forward until, at the end of the row, the depending cranked arm H' $H^2$ comes against the said wicket, and is moved backward thereby. This movement of H' $H^2$ carries of course the crank H, rod G, and crank-arm E' forward, so that the leaf $E^2$, fixed, as before described, to the under side of the shaft E, comes against the spring-rod D', and presses it out from the notch F'. The lever D, being thus released and impelled by the spring S, throws the clutch B' out of mesh with the wheel B, leaving the latter free to revolve upon the axle or shaft A. The chain C, therefore, also ceases its motion with the wheels B and V, and no more hills of corn are dropped. The driver now turns his machine around to begin a new set of rows, and soon as the arm H' comes in line with the wicket W, throws into clutch the wheel B, which in the preceding trip was idle. This causes the chain C to move in the opposite direction to its previous movement, and it will take just as long for a knot or catch, C', which, at the end of the preceding trip, had just left a lever, L, to return thereto and cause a hill of corn to be dropped as it did to leave it. This will cause the first hills of corn to be in line with the last hills of the other two rows.

What I claim as my invention, and for which I desire Letters Patent, is as follows, to wit:

1. In check-rowers of the within-described kind, the wheel B, connected by suitable mechanism to the chain-impelling wheel V, and the clutch B', in combination with the lever D, having spring S, catch or notch F', shaft E, having leaf E² and crank-arm E', connecting-rod G, crank H, and depending arm H' H², substantially as and for the purpose set forth.

2. In check-rowers of the within-described kind, the axis A, rigid with one or both of the drive-wheels R, sprocket-wheels B B, clutches B' B', operated by levers D D and depending arms H' H² coming in contact with a wicket, W, sprocket-wheels T T, connected with said wheels B B by chains, shafts T' T', bevel-gears U U, and impelling-wheels V V, in combination with the endless chain C, having catches C', the wheels V' V', and levers L L, operating the feed-slide L', substantially as and for the purpose specified.

In testimony that I claim the foregoing invention I have hereunto set my hand this 10th day of October, 1882.

THEODORE A. LANSCHA.

Witnesses:
PETER FLANAGAN,
J. C. MURPHY.